June 18, 1968  TOSHIO YOSHIOKA  3,388,475
CENTERLESS UNIVERSAL ARC RULER

Filed Jan. 18, 1967  3 Sheets-Sheet 1

Toshio Yoshioka,
INVENTOR.

BY Wenderoth, Lind
and Ponack,
ATTORNEYS

June 18, 1968  TOSHIO YOSHIOKA  3,388,475
CENTERLESS UNIVERSAL ARC RULER

Filed Jan. 18, 1967  3 Sheets-Sheet 2

Toshio Yoshioka,
INVENTOR.

BY Wenderoth, Lind
and Ponack.
ATTORNEYS

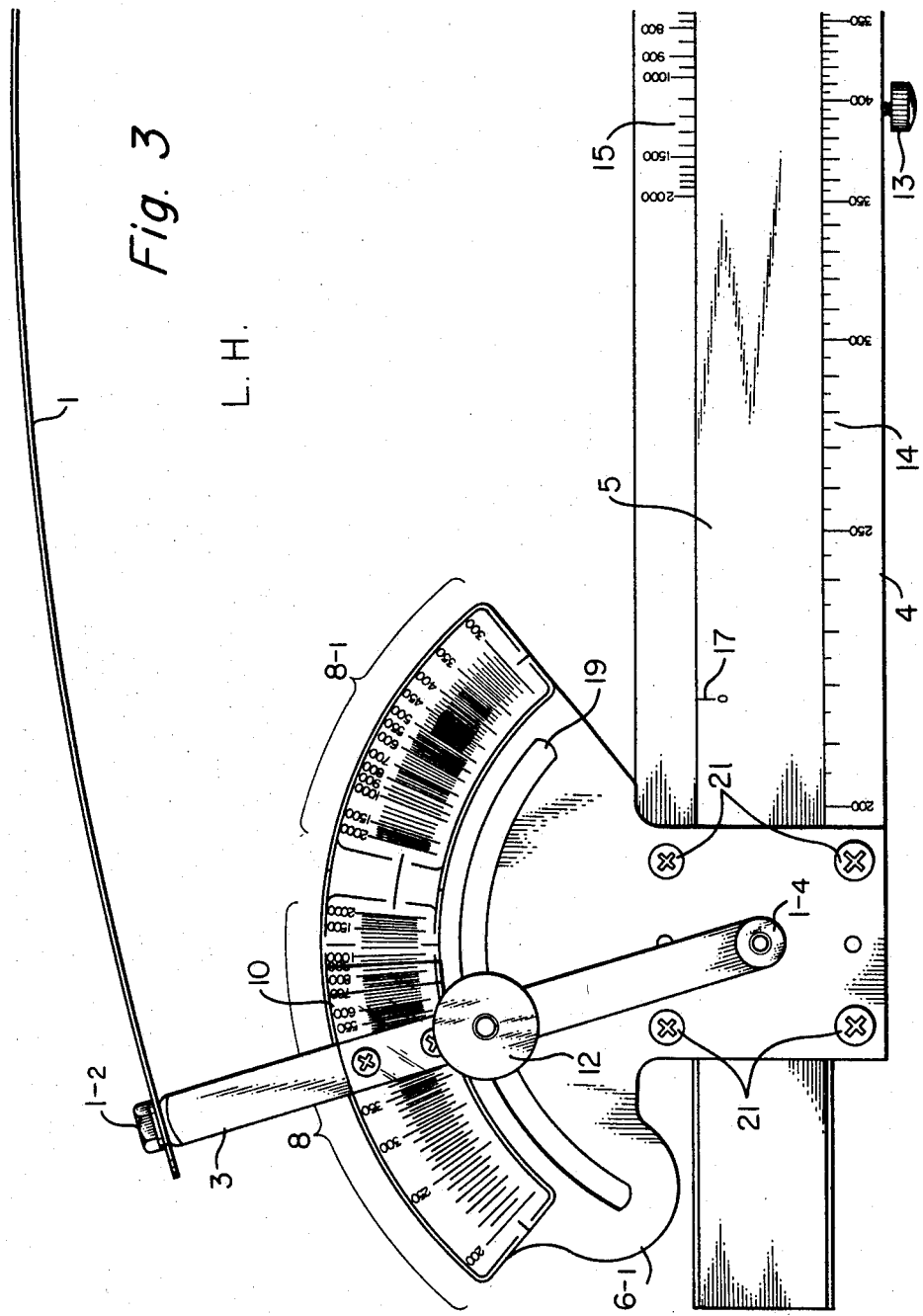

United States Patent Office 3,388,475
Patented June 18, 1968

3,388,475
CENTERLESS UNIVERSAL ARC RULER
Toshio Yoshioka, Tokyo, Japan, assignor of sixty percent to Shigeo Tunashima, Nerima-ku, Tokyo, Japan
Filed Jan. 18, 1967, Ser. No. 610,165
1 Claim. (Cl. 33—177)

ABSTRACT OF THE DISCLOSURE

A rule for drawing circular arcs without having to lay out the center of curvature, comprising a flexible ruler member, two arms, one secured to each end of said flexible ruler member, the other ends of said arms being pivoted on arc-shaped discs, two relatively slideable members, one secured to each of said arc-shaped discs, one of said slideable members having two scales thereon adjacent the other slideable member for different radii of curvature, one scale being for convex arcs and the other being for concave arc, an index on the other slideable member for concave curves adjacent the scale on the one slideable member for concave curves and an index on the other slideable member for convex curves adjacent the scale on the one slideable member for convex curves, means on one slideable member for temporarily fixing one slideable member relative to the other, two arc-shaped scales on each disc, one for concave curves and one for convex curves and each having graduations corresponding to different radii of curvature and to the graduations on said one slideable member, index means on each arm cooperable with said arc-shaped scales, and means on said arms for temporarily fixing the arms relative to said discs.

BACKGROUND OF THE INVENTION

Field of the invention

The present invention relates to a ruler which can be used to draw a circular arc of substantially any radius without the necessity of first locating the center of the circle of which the arc forms a part.

When it is desired to draw a circular arc with a particular radius, it is impossible to draw such a circular arc accurately without first locating the center of the circular arc. Customarily, therefore, one must first locate the center of the circular arc. It is also recognized that it is almost impossible to draw a circular arc having an extremely large radius.

SUMMARY OF THE PRESENT INVENTION

The ruler of the present invention comprises a flexible ruler portion having the ends attached to two arms which are in turn pivoted to the ends of two interacting slide members, at least one of which has a scale thereon and the other of which has at least an index thereon. In addition, curved scales are attached to each of the slide members beneath the pivoted arms with which the arms can be aligned. Set screws are provided for fixing the sliding scales relative to each other and for fixing the arms on the curved scales.

The ruler of the invention can form an accurate circular arc of any given radius, by fixing only three points, by the following procedure: (1) match graduations on sliding scales which designate a magnitude of radius at the desired radius and fix the scale by a set screw; and (2) set two arms precisely on the desired graduations provided on a corresponding curved scale by a set screw. It is not necessary to first locate the center and lay out a radius. Moreover, either convex or concave circular arcs can be formed by the steel ruler strip which is attached between the two arms. A precise circular arc can be drawn by running a pencil or other drawing tool along the steel strip.

BRIEF DESCRIPTION OF THE DRAWINGS

In order that the invention may more readily be understood, it will be described with reference to the accompanying drawings which illustrate one preferred embodiment of an apparatus according to the invention and in which:

FIG. 3 is a top plan view, on an enlarged scale, of the parts at one end of the ruler.

DESCRIPTION OF A PREFERRED EMBODIMENT

Figure 1:
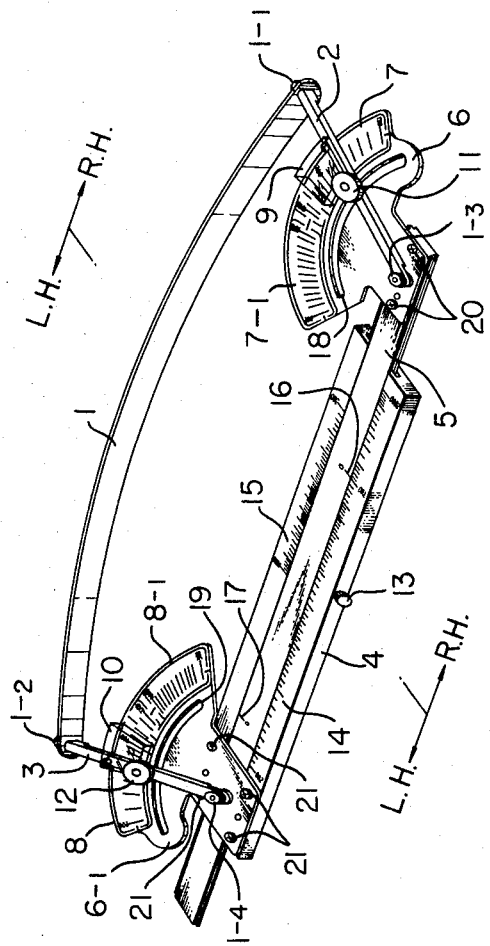
FIG. 1 is a perspective view of the ruler of the invention with the parts in position for drawing a convex circular arc.
Figure 2:
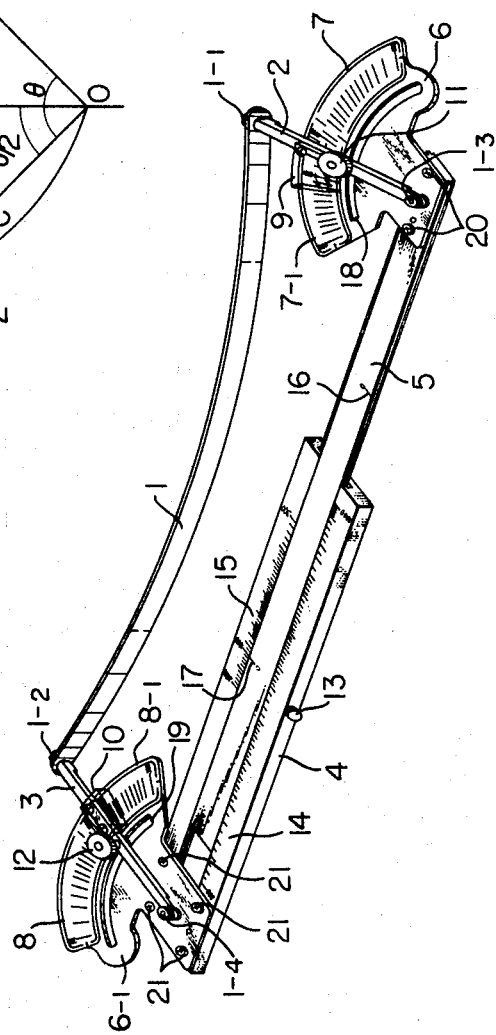
FIG. 2 is a perspective view similar to FIG. 1 showing the parts in position for drawing a concave circular arc.

As shown in FIGS. 1-3, the ruler of the present invention comprises a ruler member 1 made of a strip of extremely uniformly finished special alloy steel and which is provided with equidistantly spaced graduations therealong from the center thereof to both ends. An arm is provided at each end of the ruler member 1, the arm 2 being at the right end and the arm 3 being at the left end, which arms are made of a tough strong material. The right hand end of the ruler member 1 is held on the end of arm 2 by a securing means, such as a bolt 1—1 extending into a threaded hole in the end of arm 2, or a nut threaded onto a threaded projection on the end of arm 2. A similar securing means 1-2 holds the left hand end of the ruler member 1 to the end of arm 3. The other end of the arm 2 is pivoted to the base of an arc-shaped disc 6 by a pivot 1-3, while the other end of the arm 3 is pivoted to the base of a corresponding arm-shaped disc 6-1 by a pivot 1-4. Attached to the base of the arc-shaped disc 6-1 by securing means in the form of screws 21 is a grooved relatively slideable member 4 having a scale 14 along one edge of the groove therein for indicating radii of convex circular arcs and having a scale 15 along the other edge of the groove for indicating radii of concave circular arcs. Attached to the base of the arc-shaped disc 6 by securing means in the form of screws 20 is a relatively slideable member 5 slideable in the grooved slideable member 4, and having an index 16 thereof adjacent the scale 14 and an index 17 adjacent the scale 15. A set screw 13 is provided in the relatively slideable member 4 to fix the relatively slideable members 4 and 5 relative to each other.

Positioned on arc-shaped disc 6 along a circular arc having the pivot 1-3 as a center is a scale 7 having graduations corresponding to radii of convex circular arcs and a scale 7-1 having graduations corresponding to radii of concave circular arcs. Positioned on arc-shaped disc 6-1 along a circular arc having the pivot 1-4 as a center is a scale 8 having graduations corresponding to radii of convex circular arcs and a scale 8-1 having graduations corresponding to radii of concave circular arcs. Mounted on the arm 2 is a transparent member 9 having an index thereon adapted to cooperate with the graduations on the scales 8 and 8-1. Set screws 11 and 12 are provided on the respective arms 2 and 3 and cooperate with slots 18 and 19 in the respective discs 6 and 6-1 to fix the arms 2 and 3 to the discs 6 and 6-1.

The centerless universal circular arc ruler functions extremely well in spite of its very simple construction, as will be clear from the following description of how to operate the ruler to produce a convex circular arc with a radius of 300 mm. and also a concave circular arc of the same radius.

First, the set screws 11 and 12 on the right and left arms 2 and 3 are loosened to relieve the arms from the arc-shaped scales 7, 7–1, 8 and 8–1. At the same time, the set screw 13 on the one slideable member 4 is released to permit the slideable members to slide relative to each other. The right arm 2 is then pivoted to position the index on the member 9 in alignment with the graduation on the scale 7 corresponding to 300 mm., and the set screw 11 is again tightened to fix the arm 2 in this position. The left arm 3 is then pivoted to align the index on the member 10 with the graduation on the scale 8 corresponding to 300 mm. and set screw 12 is tightened. Finally, the index 16 on the slideable member 5 is aligned with the graduation on the scale 14 on the slideable member 4 which corresponds to 300 mm., and the set screw 13 is tightened. The ruler member 1 will then be bent in a convex circular arc having a radius of 300 mm.

The procedure for forming a concave circular arc is essentially the same. The set screws 11, 12 and 13 are loosened, the arms 2 and 3 pivoted until the indexes on the members 9 and 10 are aligned with the graduations corresponding to a radius of 300 mm. on the scales 7–1 and 8–1, respectively, and the set screws 11 and 12 are tightened. The slideable members are then moved relative to each other until the index 17 on the slideable member 5 is aligned with the graduation on the scale 15 which corresponds to 300 mm., after which the set screw 13 is tightened.

The ease and simplicity of using the ruler make it possible to learn to use it in a very short time. Moreover, it is not limited to drawing only a concave or a convex curve. By combining the curves it is possible to draw any curve. In addition, it is possible to find the center of curvature by drawing a perpendicular from the middle of the combined slideable members 4 and 5, i.e. from a point halfway between pivots 1–3 and 1–4, and an extension of the centerline of either arm 2 or 3, or an extension of the centerlines of both arms, the point of intersection being the center of curvature. There are thus many practical applications of the ruler of the invention other than simply drawing arcs.

There has thus been provided a simple, lightweight and easy to use ruler which can provide a guide for drawing the arc of a circle of substantially any radius without the necessity of providing a center for the arc, and which makes possible the drawing of compound concave and convex curves in an easy and simple manner.

Figure 4:
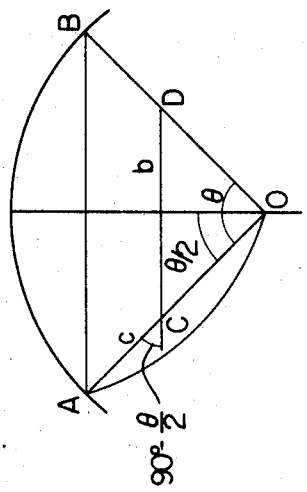
FIG. 4 is a geometric diagram illustrating the principle on while the ruler of the invention is based.

The principle of operation of the device will be explained with reference to FIG. 4. In FIG. 4, $\theta$ is the angle at the center of curvature O of arc $\widehat{AB}$, R is the radius (equal to AO and BO) of arc $\widehat{AB}$; $b$ is a straight line which extends from point C on radius AO and parallel to a chord AB until it meets the radius BO at a point D thereon, the line being designated CD and hereinafter called a "secondary chord," $c$ is a point on the radius AO at a distance minus R–C from the center O ($c$ is a constant and is an important factor in the design of the ruler).

The relationship among the above four elements, AB, $\theta$, R and $b$ is defined by the following Equations 1 and 2:

(1) $$\sin \theta/2 = \frac{b/2}{R-c} \qquad b = 2 \sin \theta/2 \, (R-c)$$

(2) $$\theta = \frac{360 \times AB}{2\pi R} \qquad \theta/2 = \frac{90 \times AB}{\pi R}$$

In connection with the illustration of the basic idea of the invention, taking advantage of the four members AB, $\theta$, R and $b$ in the above Equations 1 and 2, it is perceived at first that it is necessary and convenient to set certain minimum limitations among them from the point of view of realizing the basic idea, i.e., fabricating the ruler of this invention while fulfilling and realizing various requirements such as that it be tough and simple in construction with few small parts, easy to handle, lightweight and small size, handy to carry, smartness of style, etc. Certain essential limitations are summarized as follows:

(1) Arc AB is kept at a constant length in any particular instrument; however, depending on the magnitude of the range of variable radii, the constant length itself is necessarily different. For example, when the ruler is comparatively small in size, arc AB (measured in a straight line) = 400 mm. and the range of radii R (for a concave circular arc) = 200 mm.–2,000 mm. When AB (measured in a straight line) = 800 mm., radii R (for a concave circular arc) = 350–5,000 mm. Modification of the size as described above according to the capacity of the ruler enables the fabrication of a comparatively large sized ruler suitable for drawing very large radius circular arcs.

(2) As the magnitude of R increases:

(a) the length of $b$ increases accordingly, but its rate of the increase is less;

(b) angle $\theta$ decreases accordingly, but its rate of decrease is less.

The manner of embodying a ruler according to the invention can therefore be said to be as follows:

(1) Determine the magnitude of angle $\theta$ by calculating $\theta/2$ according to variable R from Equation 2.

(2) The magnitude of constant $c$ is preferably ⅗ of the minimum value R of an arc which the ruler can draw. For example: $c = 120$ mm. for a ruler in which AB, measured in a straight line = 400 mm., and the length of arms 2 and 3 are equal. Preferably the ruler having a member 1 with a length AB measured in a straight line = 400, has the arms 2 and 3 with a length of 120 mm. ($= 200 \times ⅗$).

(3) The values of $b$ are calculated from the Equation 1 for various R's.

(4) Using the values of $b$, graduations 14 and graduations 7 and 8 for a concave circular arc are impressed on the proper spots on the surface of the slideable member 4 and on the scales on discs 6 and 6–1, and graduations 15 and 7–1 and 8–1 for a convex circular arc are impressed on the proper spots in the surface of slideable member 4 and on the scales on discs 6 and 6–1.

(5) First, calculate the value of every angle $\theta$ for same length of the arc AB, from the Equation 2, and calculate the value of every $b$ (secondary chord) results from the variable R. Then those are to be impressed on the surfaces of slideable member 1 as scales 14 and 15, and on the scales 7 and 7–1 and 8 and 8–1 on discs 6 and 6–1, respectively. And all consequences and results preceded while selecting the value of given R out of each graduation so that index 9 or 10 corresponds thereto so as to comply with the variable R are expressed by means of converging it to the steel strip arc 1. In the resultant there is to be seen a certain basic idea of my invention "Centerless Universal Circular Arc Ruler," and the basic mode for the fabrication of the same.

The descriptions herein are intended to be illustrative only and it is to be understood that changes and variations may be made without departing from the spirit and scope of the invention as defined by the appended claim.

What is claimed is:

1. A ruler for drawing circular arcs without having to lay out the center of curvature, comprising a flexible ruler member, two arms, one secured to each end of said flexible ruler member, the other ends of said arms being pivoted on arc-shaped discs, two relatively slideable members, one secured to each of said arc-shaped discs, one of said slideable members having two scales thereon adjacent the other slideable member for different radii of curvature, one scale being for convex arcs and the other being for concave arcs, an index on the other slideable member for concave curves adjacent the scale on the one slideable member for concave curves and an index on the other slideable member for convex curves adjacent the scale on the one slideable member for convex curves, means on one slideable member for temporarily fixing one slideable member relative to the other, two arc-shaped scales on each disc, one for concave curves and one for convex curves and each having graduations corresponding to different radii of curvature and to the graduations on said one slideable member, index means on each arm cooperable with said arc-shaped scales, and means on said arms for temporarily fixing the arms relative to said discs.

References Cited

FOREIGN PATENTS 125,769  10/1947  Australia.

SAMUEL S. MATTHEWS, *Primary Examiner.*